Patented June 6, 1939

2,161,737

UNITED STATES PATENT OFFICE 2,161,737

POLYMERIZED DI-(2-CHLOROALLYL) ETHER

Gerald H. Coleman and Robert W. Sapp, Midland, Mich., assignors to The Dow Chemical Company, Midland, Mich., a corporation of Michigan No Drawing. Application October 6, 1937, Serial No. 167,630

1 Claim. (Cl. 260—80)

This invention concerns di-(2-chloroallyl) ether, a new polymerizable compound, and a method of preparing the same.

Monomeric di-(2-chloroallyl) ether has the formula:

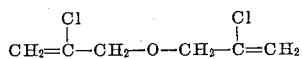

It is a colorless, mobile liquid with a characteristic odor, and may be used as an intermediate in the preparation of other organic chemicals as well as in the formation of the polymeric material.

Monomeric di-(2-chloroallyl) ether may be prepared by heating a mixture of 2-chloroallyl chloride and an aqueous solution of an alkali metal hydroxide at reflux temperature for several hours. If desired, the reaction may be carried out more rapidly by heating the mixture under pressure, e. g., in a bomb or autoclave, at higher temperature. We prefer to employ approximately one mol of alkali metal hydroxide and 6–12 mols of water per mol of the 2-chloroallyl chloride, although other proportions may be employed if desired. After reaction is complete, the reacted mixture consists of an upper aqueous layer and a lower organic layer. The lower layer is removed and fractionally distilled to separate the ether product.

Di-(2-chloroallyl) ether may also be obtained by direct reaction between 1,2,3-trichloropropane and aqueous alkali. As shown in our co-pending application, Serial No. 178,401, filed December 6, 1937, 2-chloroallyl chloride may be prepared by heating a mixture of 1,2,3-trichloropropane and a dilute aqueous alkali solution at reflux temperature. We have found that if this reaction is carried out using more than about 2 mols of alkali per mol of 1,2,3-trichloropropane and heating for a somewhat longer time, di-(2-chloroallyl) ether and the corresponding alcohol are formed. By operating in this manner, di-(2-chloroallyl) ether may be prepared directly from 1,2,3-trichloropropane without the necessity of isolating the intermediate 2-chloroallyl chloride. However, the ether is usually obtained in highest yield when 2-chloroallyl chloride is employed as a starting material.

The following examples illustrate various ways in which the invention has been practiced, but are not to be construed as limiting the invention:

Example 1

A mixture of 2664 grams (24.0 mols) of 2-chloroallyl chloride and 980 grams (24.5 mols) of sodium hydroxide dissolved in 3600 grams (200 mols) of water was heated at reflux temperature for 10 hours in a 3-necked flask fitted with stirrer, thermometer and reflux condenser. The temperature of reflux was 78°–84° C. The reaction mixture was distilled from the flask and allowed to separate into two layers. The lower, water-insoluble layer was washed twice with water and fractionally distilled. There was obtained di-(2-chloroallyl) ether, a colorless, mobile liquid distilling at 114°–115° C. under 118 millimeters pressure, having a specific gravity of 1.180 at 20/4° C. and an index of refraction, $$n_D^{20} = 1.4781$$

Analysis gave 42.37 per cent of chlorine, the theoretical being 42.73 per cent.

Example 2

A mixture of 241 grams (8.42 mols) of 1,2,3-trichloropropane and 688 grams (17.2 mols) of sodium hydroxide dissolved in 1880 grams (100 mols) of water was heated at reflux temperatures for 10 hours as in Example 1. The reflux temperature was 105° C. at the beginning of the reaction and 86° C. as the reaction neared completion. The ether product was recovered from the reaction mixture as in Example 1, there being obtained di-(2-chloroallyl) ether along with 2-chloroallyl alcohol and 2-chloroallyl chloride.

Monomeric di-(2-chloroallyl) ether polymerizes upon heating to a tough, black, rubber-like solid which is insoluble in benzene, ethyl alcohol, ethylene dichloride, acetone, and other common organic solvents. It may be compounded with gums, waxes, fillers, plasticizing agents, etc., to form plastic masses useful in arts. The polymerization is usually carried out by heating the monomeric material at reflux temperature under atmospheric or reduced pressure, the time required for the polymerization varying according to the temperature employed. Moreover, the physical properties of the polymer may be varied somewhat by changing the conditions of polymerization. For example, the polymer prepared by heating monomeric di-(2-chloroallyl) ether at reflux temperature under atmospheric pressure for 11½ hours was harder and more brittle than the polymer prepared by distilling the monomeric compound under 125 millimeters pressure.

Other modes of applying the principle of our invention may be employed instead of those explained, change being made as regards the method herein disclosed, or the materials employed, provided the step or steps stated by the following claim be employed or the product claimed in the following claim be obtained.

We therefore particularly point out and distinctly claim as our invention:

Polymerized di-(2-chloroallyl) ether.

GERALD H. COLEMAN.
ROBERT W. SAPP.